United States Patent
Meyers et al.

(10) Patent No.: US 9,491,177 B2
(45) Date of Patent: Nov. 8, 2016

(54) GRANTING PERMISSIONS TO AN OBJECT WHEN ADDING PEOPLE TO A CONVERSATION

(71) Applicant: Microsoft Technology Licensing, LLC, Redmond, WA (US)

(72) Inventors: David L. Meyers, Bellevue, WA (US); David P. Limont, Seattle, WA (US); Kenneth Fern, Bellevue, WA (US); Michael B. Palmer, Redmond, WA (US); Betsy Y. McIntyre, Redmond, WA (US); Mirela D. S. Correa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/053,361

(22) Filed: Oct. 14, 2013

(65) Prior Publication Data

US 2015/0106877 A1     Apr. 16, 2015

(51) Int. Cl.
| | | |
|---|---|---|
| *H04L 29/06* | (2006.01) | |
| *G06F 7/04* | (2006.01) | |
| *H04L 12/58* | (2006.01) | |
| *G06F 21/62* | (2013.01) | |
| *G06F 21/31* | (2013.01) | |

(52) U.S. Cl.
CPC ............ *H04L 63/101* (2013.01); *G06F 21/31* (2013.01); *G06F 21/6218* (2013.01); *H04L 51/04* (2013.01); *H04L 51/08* (2013.01); *H04L 51/14* (2013.01); *H04L 51/24* (2013.01); *H04L 63/08* (2013.01); *H04L 63/10* (2013.01); *H04L 51/34* (2013.01)

(58) Field of Classification Search
None
See application file for complete search history.

(56) References Cited

U.S. PATENT DOCUMENTS

| | | | |
|---|---|---|---|
| 7,783,711 B2* | 8/2010 | LeVasseur et al. | 709/206 |
| 2005/0010799 A1* | 1/2005 | Kelley et al. | 713/200 |
| 2006/0294187 A1 | 12/2006 | Hakel et al. | |
| 2008/0028017 A1 | 1/2008 | Garbow et al. | |
| 2008/0120382 A1* | 5/2008 | Heidloff | G06Q 10/107 709/206 |
| 2008/0120383 A1* | 5/2008 | Kumar | H04L 51/28 709/206 |
| 2009/0031393 A1* | 1/2009 | Denner | G06Q 10/00 726/1 |
| 2009/0313348 A1 | 12/2009 | Plestid | |
| 2010/0169439 A1* | 7/2010 | O'Sullivan et al. | 709/206 |
| 2011/0137947 A1 | 6/2011 | Dawson et al. | |
| 2011/0258234 A1* | 10/2011 | Dawson et al. | 707/785 |
| 2011/0271108 A1* | 11/2011 | Kale | G06F 21/10 713/168 |
| 2012/0278404 A1* | 11/2012 | Meisels | G06Q 10/107 709/206 |
| 2012/0284345 A1* | 11/2012 | Costenaro et al. | 709/206 |
| 2012/0297463 A1* | 11/2012 | Orbach et al. | 726/4 |

(Continued)

OTHER PUBLICATIONS

"Sharing Settings for Files Inserted from Google Drive", Retrieved on: Aug. 19, 2013, Available at: https://support.google.com/mail/answer/2487407?hl=en.

(Continued)

*Primary Examiner* — Fatoumata Traore
(74) *Attorney, Agent, or Firm* — Anand Gupta; Tom Wong; Micky Minhas

(57) ABSTRACT

A user generates a message by adding a recipient in order to send the message to the recipient. The message has a link to an attached object which is automatically detected and it is determined whether the recipient has rights to the object. If not, the recipient's rights are automatically modified so that the recipient has rights to the object, and the user is notified of the modified permissions.

6 Claims, 17 Drawing Sheets

(56) References Cited

U.S. PATENT DOCUMENTS

2013/0080545 A1 3/2013 Datta
2014/0165176 A1* 6/2014 Ow .................................. 726/8

OTHER PUBLICATIONS

Jayakumar, Harish, "New Simplicity Secure Shared Links", Published on: Jun. 26, 2013, Available at: http://blog.syncplicity.com/blog/2013/06/syncplicity-releases-secure-shared-links.html.

International Search Report and Written Opinion for International Application No. PCT/US2014/059586, date of mailing: Feb. 2, 2015, date of filing: Oct. 8, 2014, 11 pages.

Second Written Opinion for International Application No. PCT/US2014/059586, date of mailing: Oct. 9, 2015, date of filing: Oct. 8, 2014, 6 pages.

International Preliminary Report on Patentability for International Application No. PCT/US2014/059586, date of mailing: Jan. 29, 2016, date of filing: Oct. 8, 2014, 17 pages.

* cited by examiner

GRANTING PERMISSIONS TO AN OBJECT WHEN ADDING PEOPLE TO A CONVERSATION

BACKGROUND

A variety of different types of messaging systems are currently in wide use. Some such messaging systems include, for instance, electronic mail (email) systems, instant messaging systems, communication systems within social networking systems, among others.

In using such messaging systems, it is common for users to send attachments to one another. In addition, users of social network systems can make an attachment or object available to others in a given group. In some embodiments, the attachments are provided as links to a document, a picture, a directory, a folder, etc., (all of which are collectively referred to as an object) that is stored at a given location. When the recipient receives the message, with the attached link, the recipient can actuate that link in order to retrieve and view, or otherwise have access to, the object.

However, some problems can occur with this type of communication. For instance, where a user receives a message (such as, for example, an electronic mail message) that has a link to an attached object, the user can forward that message, or reply to the message, adding a new recipient that was not on the original message. Some objects, however, are not generally accessible. For instance, an access control list often contains information that indicates which permissions or access rights each user or group of users in the messaging system has to a specific object. If the new recipient does not have access to the object that is linked to in the message, then when the new recipient clicks on (or otherwise actuates) the link to that object, the new recipient will receive an error message.

The discussion above is merely provided for general background information and is not intended to be used as an aid in determining the scope of the claimed subject matter.

SUMMARY

A user generates a message by adding a recipient in order to send the message to the recipient. The message has a link to an attached object which is automatically detected and it is determined whether the recipient has rights to the object. If not, the recipient's rights are automatically modified so that the recipient has rights to the object, and the user is notified of the modified permissions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-1 and 4-2 (collectively FIG. 4) show a flow diagram illustrating one embodiment of the operation of the architecture shown in FIG. 1 in modifying permissions for a new recipient of a message with a link to an object.

DETAILED DESCRIPTION

Figure 1:
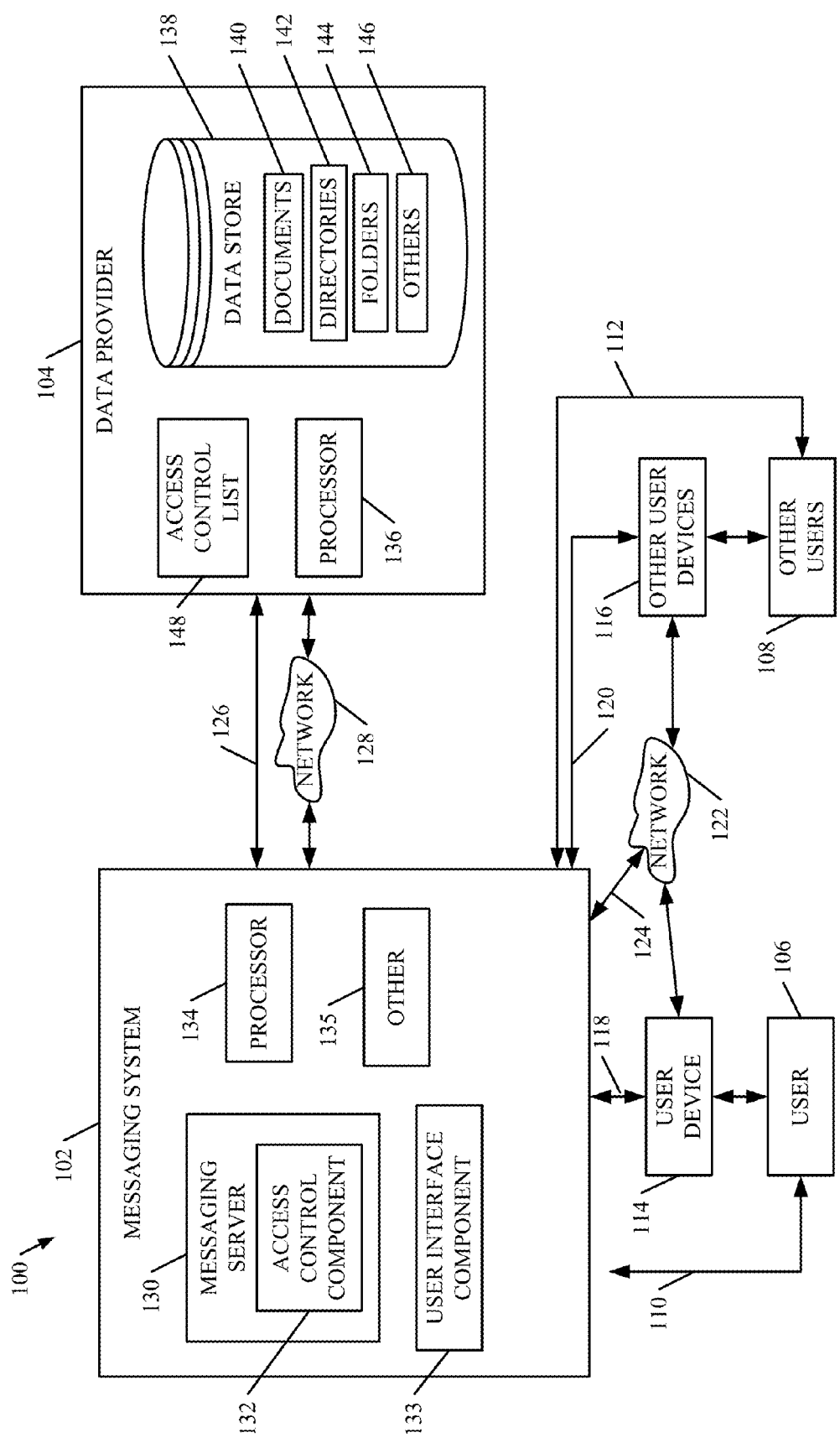
FIG. 1 is a block diagram of one illustrative messaging architecture.

FIG. 1 shows one embodiment of a block diagram of a messaging architecture 100. Messaging architecture 100 illustratively includes messaging system 102, and data provider 104. FIG. 1 also shows that users 106 and 108 illustratively have access to messaging system 102 in order to send and receive messages. User's 106 and 108 can access messaging system 102 either directly (as indicated by arrows 110 and 112) or through user devices 114 and 116. User devices 114 and 116, themselves, can access messaging system 102 either directly (as indicated by arrows 118 and 120) or through network 122 (as indicated by arrow 124).

FIG. 1 also shows that data provider 104 can be accessed by messaging system 102 either directly (as indicated by arrow 126) or over network 128. It will, of course, be appreciated that networks 122 and 128 can be the same or different networks. It will also be appreciated that, in one embodiment, data provider 104 is local to, or part of, messaging system 102. The example shown in FIG. 1, where the two are separate, is for illustrative purposes only.

In one embodiment, messaging system 102 includes messaging server 130 with access control component 132. Messaging system 102 also illustratively includes user interface component 133, processor 134, and other components 135.

Data provider 104 illustratively includes processor 136 and data store 138. Data store 138 illustratively includes a set of objects, such as documents 140, directories 142, folders 144, or other objects 146. Data provider 144 also illustratively includes access control list 148. It will be noted that access control list 148 can also be stored in data store 138 but it is shown separately therefrom for the sake of example only.

Messaging server 138 illustratively controls the operation of messaging system 102 so that users can send and receive messages. The users can also illustratively attach links to objects, within the messages. Messaging server 130 therefore also controls accessing of stored objects (stored on data provider 104) when a user actuates the link to that object from within a message, so that the user has access to the objects that are attached to (e.g., that have links in) various messages. By way of example, where messaging system 102 is an electronic mail (email) system, then messaging server 130 is an email server.

Access control component 132 illustratively identifies when recipients have been added to a message that includes a link to an object. In that case, access control component 132 can illustratively modify the permissions of the recipient, as necessary, so that the recipient has access to that object. This is described in greater detail below with respect to FIGS. 4-4D.

User interface component 133 is illustratively controlled by other components, servers, or items in messaging system 102, or elsewhere, in order to generate user interface displays for users 106 and 108. It will be noted, however, that there can also be a user interface component on user devices 114 and 116, which generates those user interface displays as well. Further, it will be noted that user interface component 133 can generate the user interface displays itself, or under the control of other items in FIG. 1.

The user interface displays illustratively include user input mechanisms that allow the users to control and manipulate messaging system 102, in order to view and manage messages. The user input mechanisms can include a wide variety of different types of user input mechanisms, such as links, icons, buttons, dropdown menus, text boxes, check boxes, etc. In addition, the user input mechanisms can be actuated by the user in a wide variety of different ways. For instance, they can be actuated using touch gestures (where the display is touch sensitive), a hard or soft keyboard or keypad, a point and click device (such as a mouse or trackball), buttons, joysticks, or other actuators. Also, where messaging system 102 or one of user devices 114 or 116 has speech recognition components, the user input mechanisms can also be actuated by using voice commands.

Processors 134 and 136 are illustratively computer processors that have associated memory and timing circuitry, not separately shown. Processor 134 is illustratively a functional part of messaging system 102 and is activated by, and facilitates the functionality of, messaging server 130, access control component 132 and other items in messaging system 102. Processor 136 is illustratively a functional part of data provider 104 and facilitates the functionality of data provider 104 in providing access to data in data store 138.

Access control list 148 is illustratively a list or other component that includes information which indicates which permissions or access rights each user or group of users in system 102 has to a specific object (such as the objects stored in data store 138). Each object illustratively has a unique security attribute that identifies which users have access to it. The access control list is illustratively a list of each object and the corresponding user access privileges that define the various access privileges (such as read, write, execute, etc.) that each user has to each object. This is just one exemplary structure for access control list 148, and others can be used as well.

Data store 138 is shown as a single data store that is local to data provider 104. It will be noted, however, that it could also be made up of multiple different data stores, all of which are local to data provider 104, all of which are remote from data provider 104 and accessible by data provider 104, or some of which are local, others of which are remote.

Networks 122 and 128 can be a wide variety of different types of networks. They can be local area networks, wide area networks, telephone networks, messaging networks, near field communication networks, etc.

Figure 2:
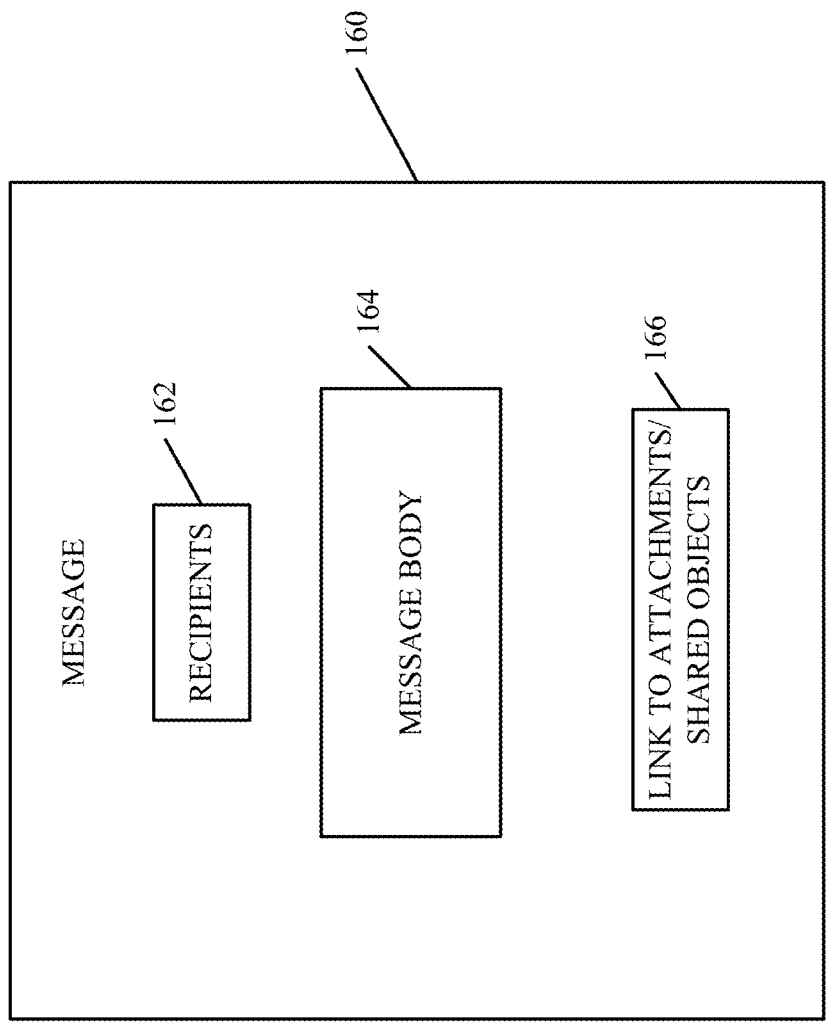
FIGS. 2 and 3 shows examples of messages.

A detailed discussion of the operation of architecture 100 is given below with respect to FIGS. 4-4D. However a brief overview will first be provided. For purposes of the present discussion, user 106 illustratively generates a message with a link to a shared object. User 106 then adds a recipient to that message and sends it on to the recipient. For the sake of example, FIG. 2 shows one embodiment of an illustrative message 160. Message 160 illustratively includes a list of recipients 162, a message body 164 and one or more links to attachments or shared objects 166. The recipients 162 can be located in a "to:" field, a "cc:" field, a "bcc:" field, etc. The message body 164 illustratively contains a main message portion for message 160 and link 166 is illustratively an actuable link that can be actuated by user 106 in order to access the attachment or shared objects that are linked to by link 166. When the user actuates link 166, the user is illustratively navigated to the object that link 166 links to.

In any case, after user 106 generates message 160, user 106 can illustratively add a recipient 162 to that message (or the recipient can be entered earlier) and send it on to the recipient 162. This can be done in a wide variety of different ways, some of which are discussed below with respect to FIG. 4. Access control component 132 illustratively detects that user 106 is sending the message to a recipient and that the message contains at least one link 166 to an attachment or shared object. Access control component 132 then determines whether the recipient 162 has permissions to the attachment or shared object and, if not, modifies the permissions so that the recipient 162 can access the attachment or shared object through link 166. Access control component 132 illustratively notifies user 106 of this as well.

Figure 3:
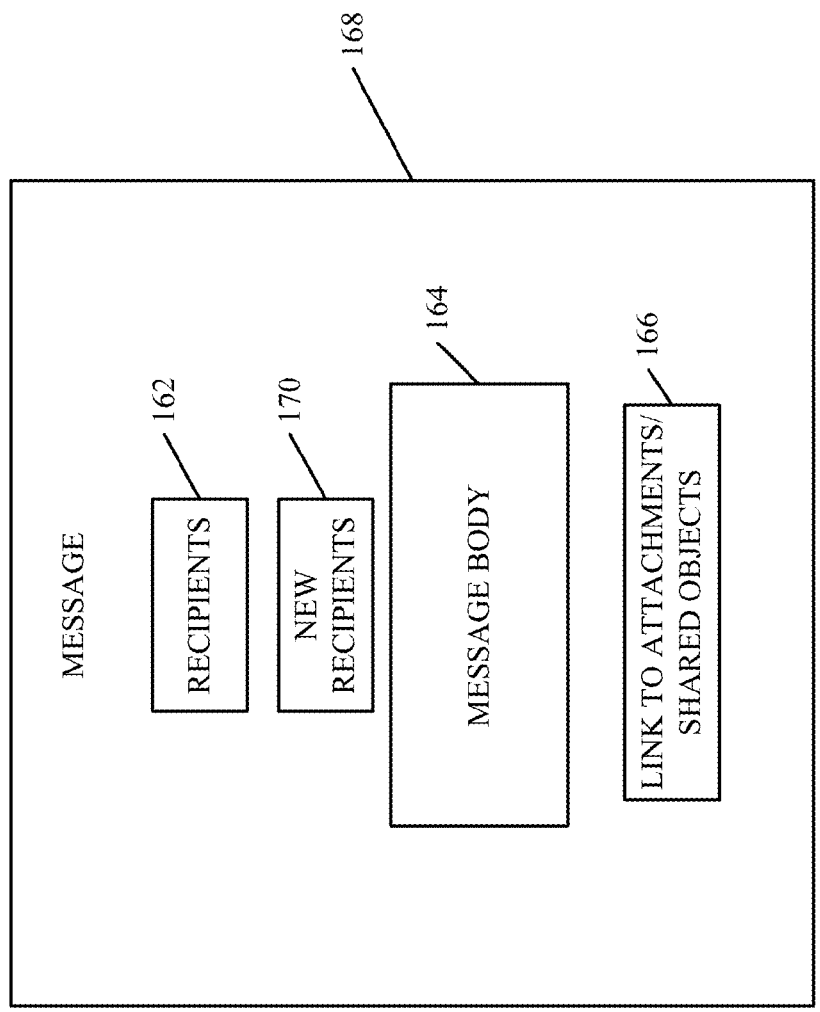

In another embodiment, the message being processed is first received by user 106, from another user 108. User 106 views the message 160 and adds one or more new recipients. FIG. 3 is one exemplary block diagram of the message 168 that is sent on to the new recipients. It can be seen that message 168 includes some or all of message 160 and can optionally include one or more of recipients 162 in the original message, one or more new recipients 170, as well as message body 164 and link 166 to the attachments or shared objects. Access control component 132 illustratively detects that user 106 is sending the message to the new recipients and that the message contains at least one link 166 to an attachment or shared object. Access control component 132 then determines whether the new recipient 170 has permissions to the attachment or shared object and, if not, modifies the permissions so that the new recipient 170 can access the attachment or shared object through link 166. Access control component 132 illustratively notifies user 106 of this as well.

Figures 1, 4:
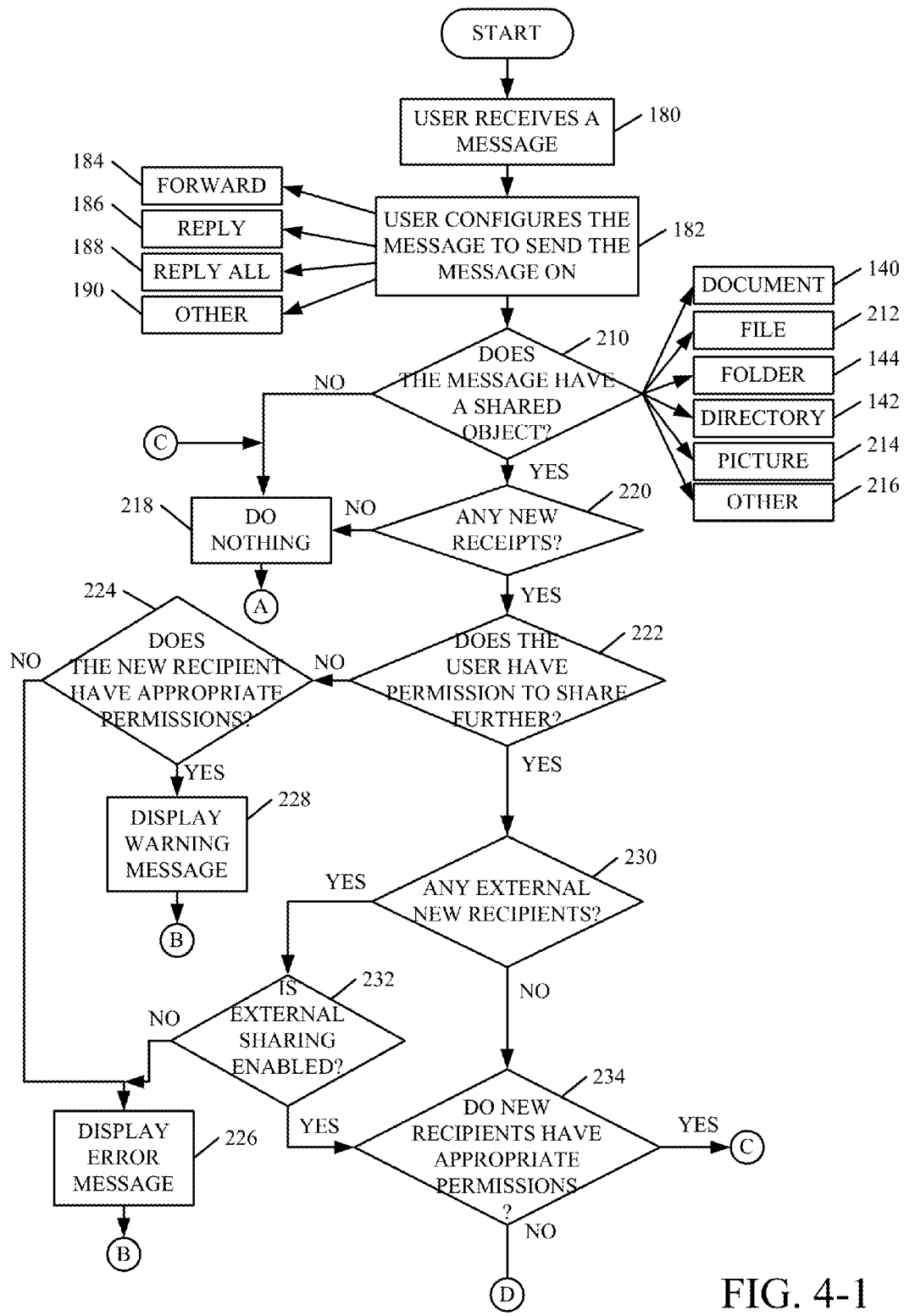
Figures 2, 4:
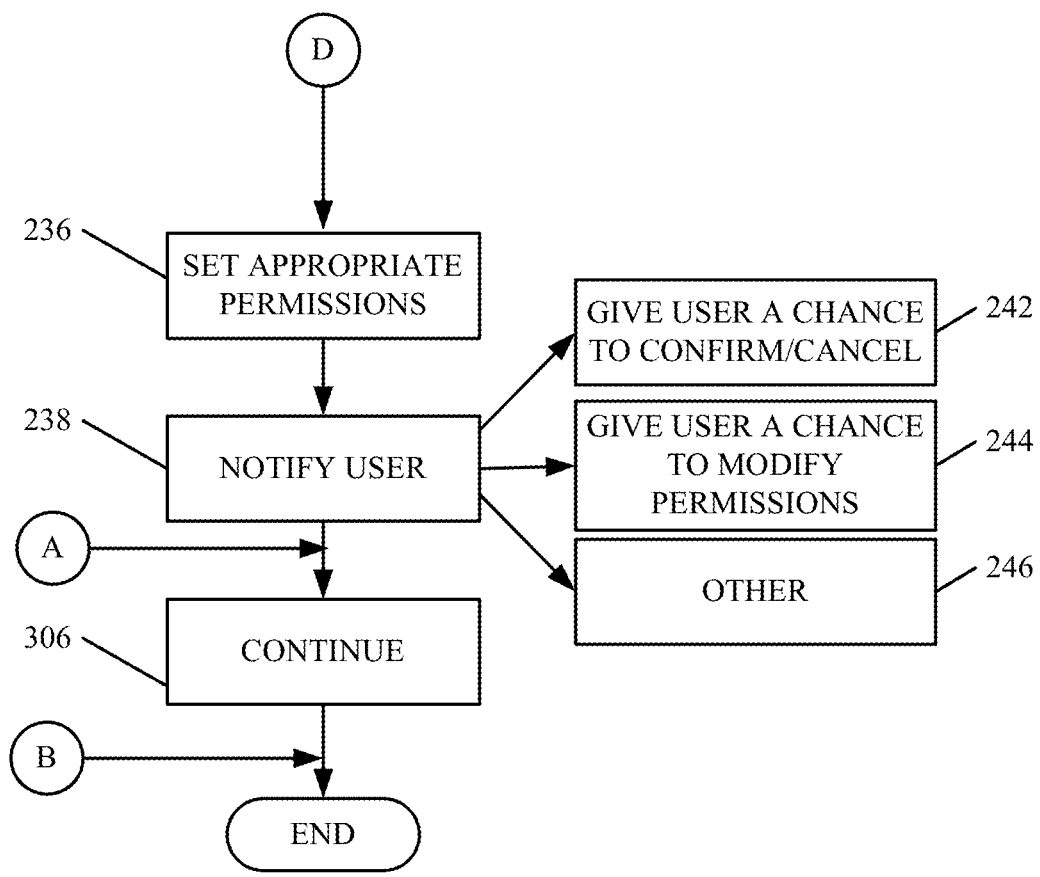

FIGS. 4-1 and 4-2 (collectively FIG. 4) show a flow diagram illustrating one embodiment of the operation of architecture 100 in sending a previously-received message to a new recipient, in more detail. It will be appreciated that substantially the processing can be performed if the user is creating a new message and entering a recipient in the "to" field, the "cc" field or the "bcc" field as well. Processing a previously-received message is described simply as a more comprehensive example. FIGS. 4A-4D are illustrative user interface displays. FIGS. 4-4D will now be described in conjunction with one another.

User 106 first receives a message, such as message 160. This is indicated by block 180 in FIG. 4. User 106 then generates a new message (such as message 168) by configuring the previously-received message to send the message on, such as by adding a new recipient 170 to message 160, to form the new message 168. This is indicated by block 182 in FIG. 4. User 106 can do this, for instance, by forwarding the message to new recipient 170, as indicated by block 184, by replying to the message and adding the new recipient 170 as indicated by block 186, by replying all to the previously-received message, and adding a recipient as the new recipient 170, as indicated by block 188, or in other ways as well, as indicated by block 190.

Figure 4A:
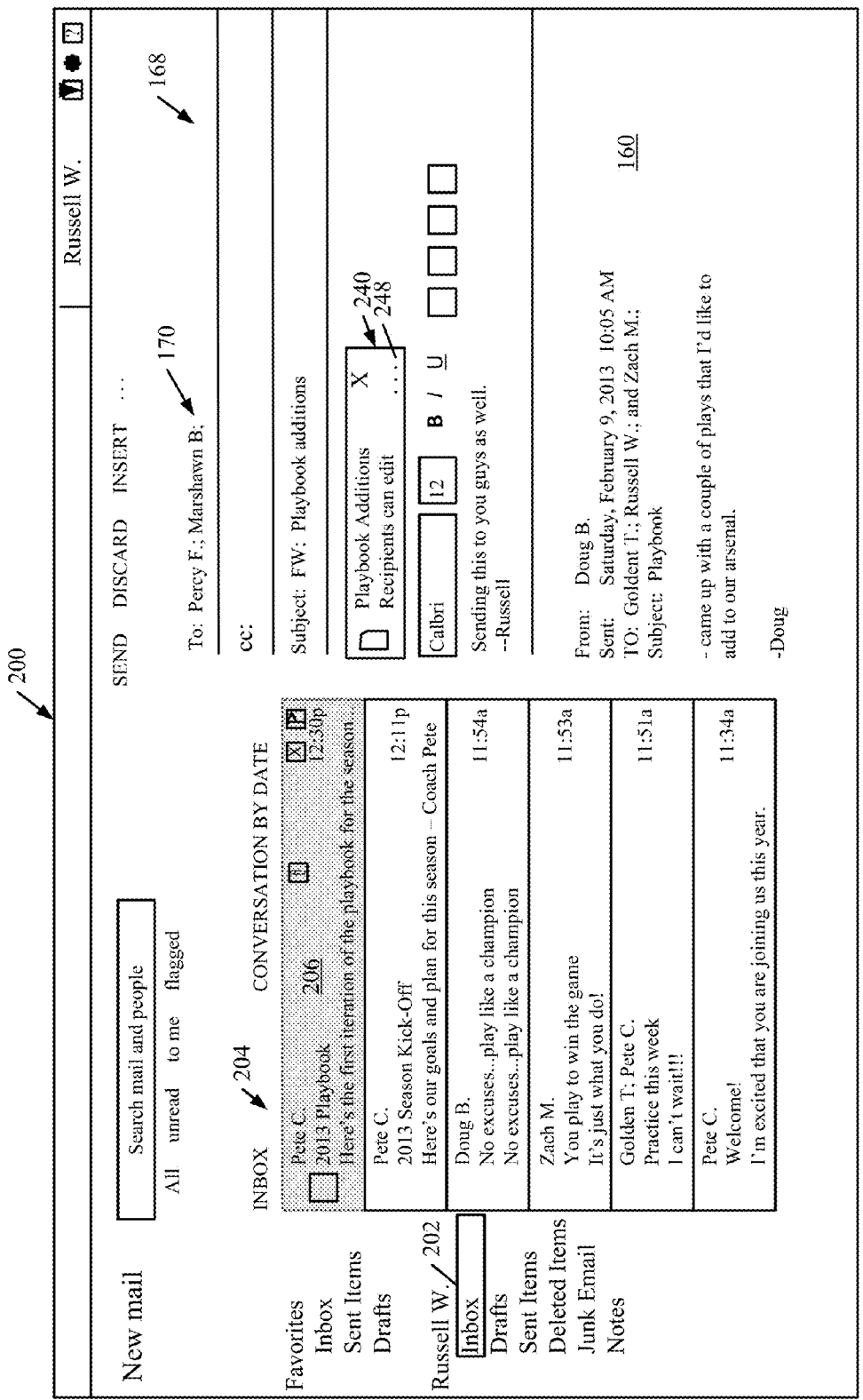
FIGS. 4A-4D are illustrative user interface displays.

FIG. 4A shows one example of a message 168 that has been configured by user 106 to be sent on to one or more new recipients. In the embodiment shown in FIG. 4A, message 168 is part of an electronic mail system, so that it is an email message. The user interface display 200 indicates, generally at 202, that user 106 is viewing his or her inbox. The inbox illustratively includes a list of conversations 204, and the user has selected conversation 206. The previously-received message 160 includes a link to a shared object and is shown as being part of message 168. Message 168, is shown with new recipients identified generally at 170. In the embodiment shown in FIG. 4A, user 106 has selected previously-received message 160 and configured the message to forward it to new recipients 170. The forwarded message with the new recipients 170 forms message 168.

Access control component 132, in messaging server 130, detects that the user 106 has configured message 160 to be sent on. Component 132 first determines whether the message has a link to a shared object. This is indicated by block 210 in FIG. 4. The shared attachment or object, as briefly mentioned above, can be a document, 140, a file 212, a folder 144, a directory 142, a picture 214, or any of a wide variety of other objects, as indicated by block 216. If there is no link to a shared object, then access control component 130 need not do anything, and the message can simply be sent on as normal. This may be the case, for instance, if the user simply replies to the message but there are no links to shared objects. Simply continuing to send the message, without doing anything further, is indicated by block 218 in FIG. 4.

However, if, at block 210, access control component 132 determines that there are one or more links to shared objects, then component 132 determines whether the message has been configured to identify any new recipients 170, different from the recipients in the previously-received message. This is indicated by block 220 in FIG. 4. Again, if the answer is no, then access control component 132 need not do anything further. This is indicated by block 218.

However, if, at block 220, it is determined that the newly configured message 168 does have new recipients 170, then access control component 132 illustratively has messaging server 130 make a call to data provider 104 to access the access control list 148 at data provider 104, in order to identify the permissions associated with user 106. Specifically, access control component 132 determines whether user 106 has the permissions required to share the present message (and the attachments or shared objects) further. This is indicated by block 222. By way of example, it may be that certain users have access to forward messages or to grant access to objects, while certain other users do not. Thus, component 132 determines whether user 106 has the appropriate permissions to share message 160 with new recipients, as well as to share the attachments or shared objects with new recipients.

If not, then access control component 132 again calls to data provider 104 in order to gain access to the access control list 148, to determine whether the new recipients 170, themselves, have the appropriate permissions to receive the message, along with the link to the attachments or shared objects. This is indicated by block 224. If not, then component 132 has determined that user 106 does not have permission to share the message, with the link to the attachments or shared objects, with new recipients, and that the identified new recipients 170 do not have the appropriate permissions to receive that information. Therefore, component 132 uses user interface component 133 to generate and display an error message indicating that the message cannot be forwarded, as it is presently configured. This is indicated by block 226 in FIG. 4.

However, if, at block at block 224, component 132 determines that, even though user 106 does not have the appropriate permissions to share the message and linked objects further, the new recipients 170 do have permission to receive that information. Therefore, component 132 uses user interface component 133 to generate a warning message to indicate this and allows the message to be sent. This is indicated by block 228 in FIG. 4.

Returning again to block 222 in FIG. 4, if user 106 does have permission to share the present message with the link to the shared objects further, then component 132 determines whether any of the new recipients 170 are external new recipients, (that is, recipients that are external to the organization that deploys messaging system 102). This is an optional step and is indicated by block 230 in FIG. 4.

If there are external recipients, component 132 determines whether external sharing is enabled within system 102. That is, system 102 may place restrictions on what types of messages or attachments can be shared externally. In fact, system 102 can completely preclude external sharing of various messages or attachments. Thus, component 132 determines whether external sharing has been enabled for this particular message, and the particular shared objects that have links to them in the message. This is indicated by block 232. If one of the new recipients 170 is an external recipient, but external sharing is not enabled within system 102, then component 132 again uses user interface component 133 to generate an error message as indicated by block 226. If external sharing is enabled, then processing continues at block 234.

Also, if at block 230 it is determined that there are no external recipients identified as new recipients 170, then processing continues at block 234. Access control component 132, at block 234, determines whether the new recipients 170 have appropriate permissions in order to receive the attachments or shared objects. Access control component 132 determines whether the new recipients have the appropriate permissions by requesting that messaging server 130 make a call to data provider 104 to gain access to the access control list 148. Component 132 examines the access control list 148 to determine whether the new recipients 170 have the appropriate permissions to access the shared documents. If so, then component 132 does not need to do anything further, and the message 168 with the new recipients 170 and the link to shared objects 166 can simply be sent as configured.

However, if, at block 234, component 132 determines that the new recipients 170 do not have the appropriate permissions to receive the new message 168 with the links to the attachments or shared objects 166, then access control component 132 sets the appropriate permissions in access control list 148 so that the new recipients 170 do have the appropriate permissions. This is indicated by block 236 in FIG. 4.

Once access control component 132 has set the permissions within access control list 148 so that the new recipients 170 have access to the attachments or shared objects, component 132 uses user interface component 133 to generate a user interface display that notifies user 106 that this has happened. This is indicated by block 238 in FIG. 4. By way of example, user interface display 200 shows that the attachments or shared objects (the playbook additions) are identified in message 168 as generally indicated by numeral 240. Numeral 240 indicates that the permissions for new recipients 170 have been modified so that the recipients have edit permissions to the attachments or shared objects. In one embodiment, access control component 132 gives user 106 a chance to confirm or cancel these permissions. This is indicated by block 242 in the flow diagram of FIG. 4. In another embodiment, access control component 132 gives user 206 a chance to modify the permissions. This is indicated by block 244. Of course, access control component 132 can notify the user that the permissions have been granted to the new recipients in other ways as well, and this is indicated by block 246.

In the example shown in FIG. 4A, a user input mechanism 248 is provided that allows the user to modify the permissions granted to the new recipients 170. When the user actuates user input mechanism 248 (such as by touching it with a touch gesture, by actuating it with a point and click device, etc.), access control component 132 uses user interface component 133 to generate a dropdown menu or other user interface mechanism that allows the user to perform certain actions with respect to the attachments or shared objects.

Figure 4B:
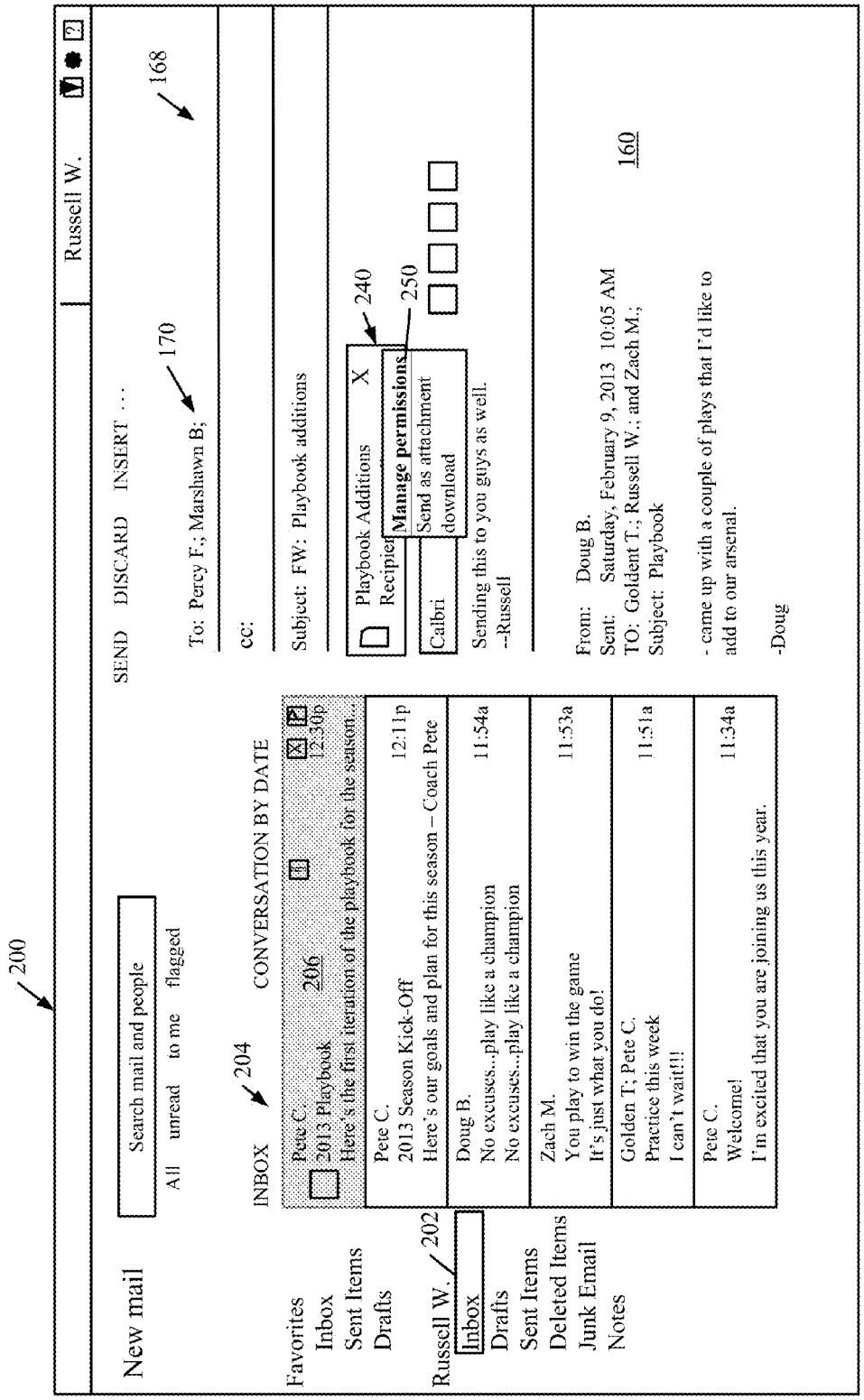

FIG. 4B shows another embodiment of user interface display 200, which is similar to that shown in FIG. 4A, and similar items are similarly numbered. However, it can be seen in FIG. 4B that the user has actuated user input mechanism 248 and a dropdown menu is displayed which includes a "manage permissions" actuator 250. When the user actuates user input mechanisms 250, access control component 132 illustratively generates a user interface display that allows user 106 to modify the permissions that have been granted to the new recipients 170.

Figure 4C:
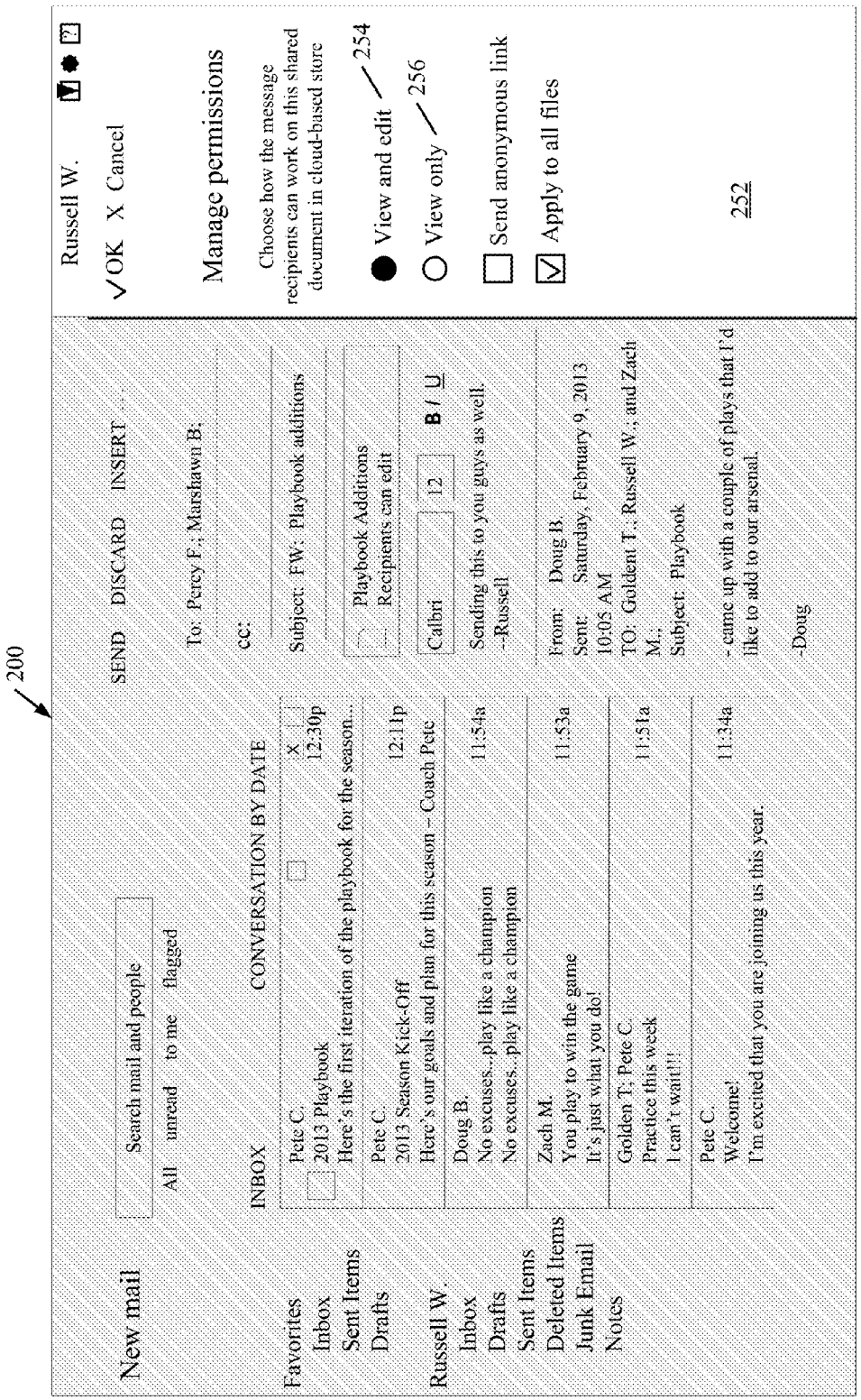

By way of example, FIG. 4C shows another embodiment of user interface display 200, that is similar to that shown in FIG. 4B, and similar items are similarly numbered. However, it can be seen in FIG. 4C that, after the user actuates the "manage permissions" user input mechanism 250, access control component 132 generates another "manage permissions" pane 252. In the embodiment shown in FIG. 4C, the user can illustratively modify the permissions granted new recipients 170 for the attachment or shared object. FIG. 4C specifically shows that the shared object is a document that is stored on a cloud-based data store. The user 106 can select user input mechanism 254 to indicate that the new recipient should have view and edit permissions to the shared document. However, the user can also actuate user input mechanism 256 that gives the new recipients view only privileges.

Figure 4D:
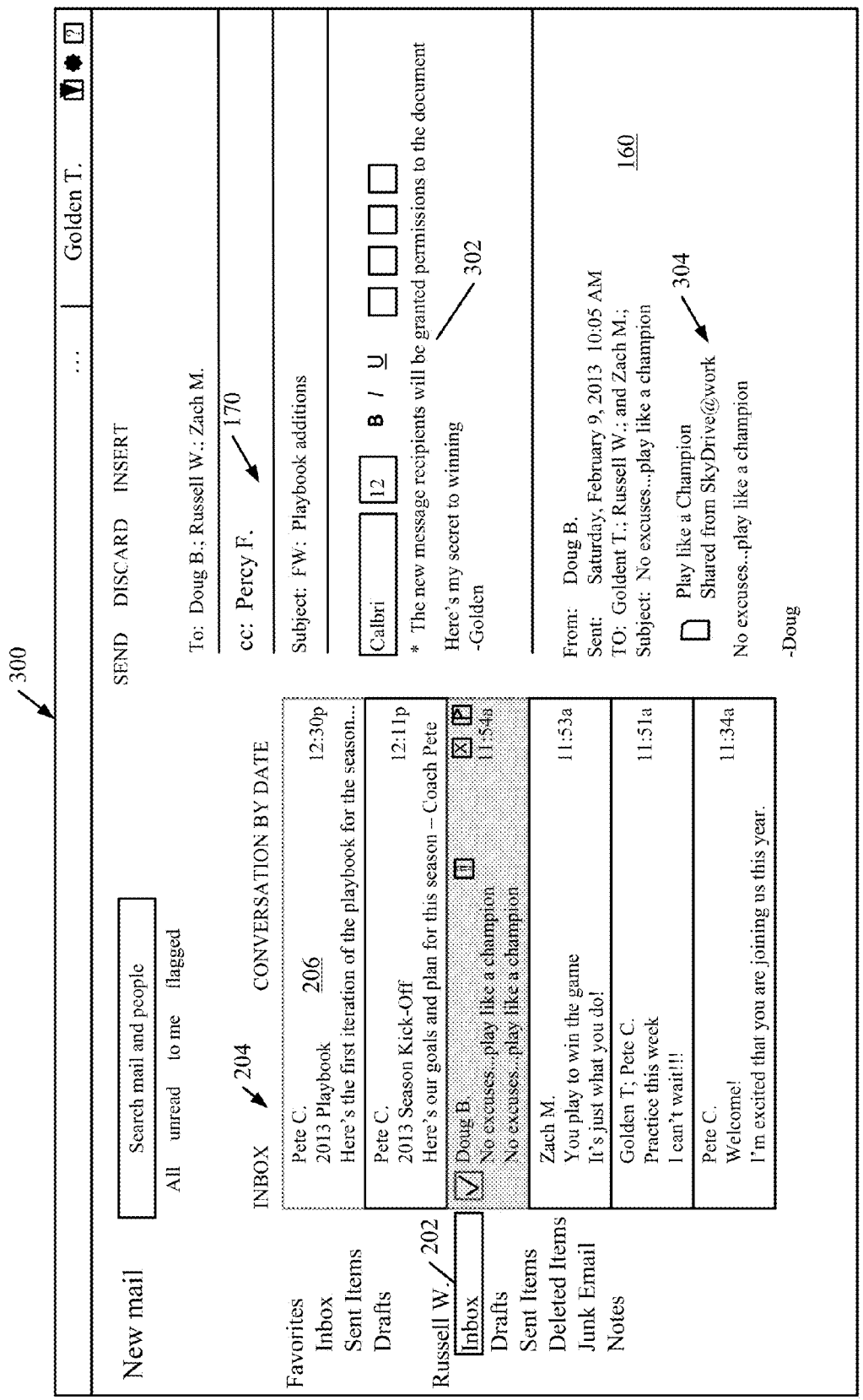

FIG. 4D shows another embodiment of a user interface display 300. User interface display 300 is similar to user interface display 200 shown in FIGS. 4A-4C, and similar items are similarly numbered. However, it can be seen that in FIG. 4D, instead of forwarding the original message 160 as message 168, the user has "replied all" to message 160 to obtain message 168 and added new recipient 170 on the cc line. FIG. 4D shows that access control component 132 illustratively uses user interface component 133 to generate a display (shown generally at 302) that notifies the user that the new message recipient 170 will be granted permission to view the attachment or shared object shown generally at 304. Again, in one embodiment, display element 302 can be a user actuable user input mechanism. Therefore, when the user actuates element 302, the user can again be navigated to a screen (or a user input mechanism can be displayed) which allows the user to modify the permissions granted to the new recipient.

In any case, once the user has been notified, the user can simply send the new message to all recipients. This is indicated generally by block 306 in the flow diagram of FIG. 4.

Figure 5:
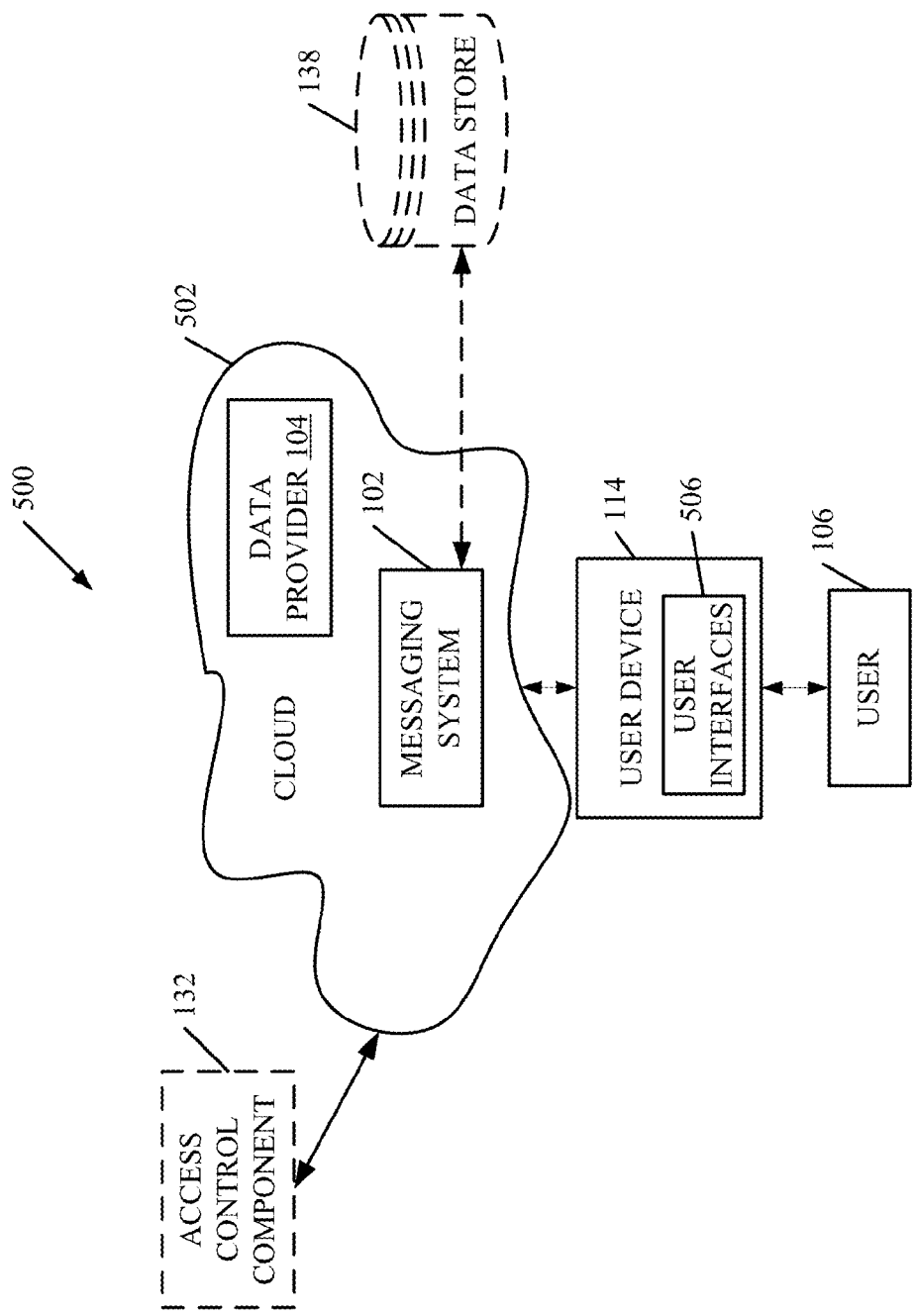
FIG. 5 shows one embodiment of the architecture shown in FIG. 1, but deployed in a cloud architecture.

FIG. 5 is a block diagram of architecture 100, shown in FIG. 1, except that it's elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 5, some items are similar to those shown in FIG. 1 and they are similarly numbered. FIG. 5 specifically shows that messaging system 102 and data provider 104 are located in cloud 502 (which can be public, private, or a combination where portions are public while others are private). Therefore, user 106 uses a user device 114 to access those systems through cloud 502.

FIG. 5 also depicts another embodiment of a cloud architecture. FIG. 5 shows that it is also contemplated that some elements of architecture 100 are disposed in cloud 502 while others are not. By way of example, data store 138 can be disposed outside of cloud 502, and accessed through cloud 502. In another embodiment, access control component 132 is also outside of cloud 502. Regardless of where they are located, they can be accessed directly by device 114, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
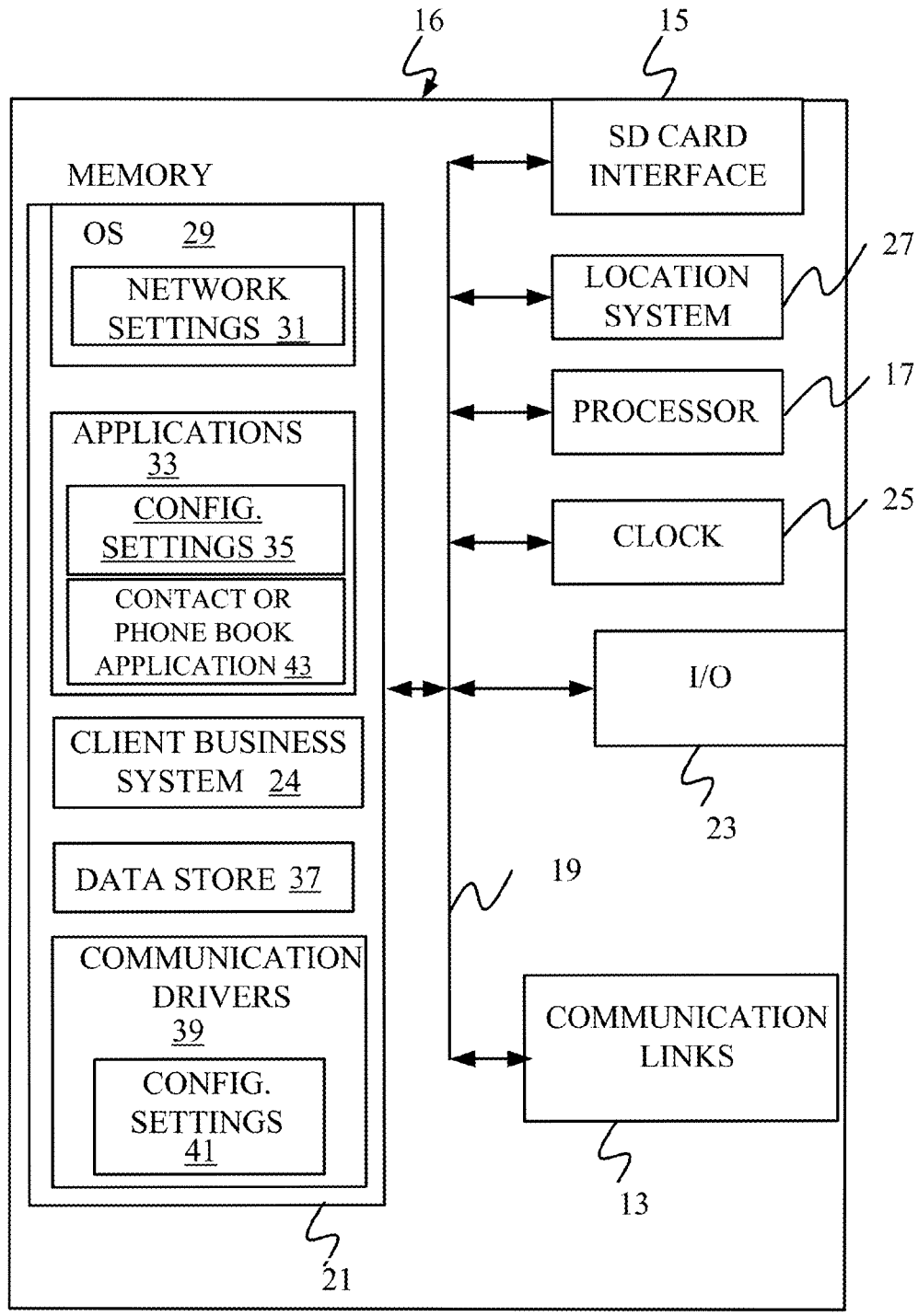
FIGS. 6-11 show various embodiments of mobile devices.

FIG. 6 is a simplified block diagram of one illustrative embodiment of a handheld or mobile computing device that can be used as a user's or client's hand held device 16, in which the present system (or parts of it) can be deployed. FIGS. 7-11 are examples of handheld or mobile devices.

FIG. 6 provides a general block diagram of the components of a client device 16 that can run components of architecture 100 or user devices 114 or 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 134 or 136 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 7:
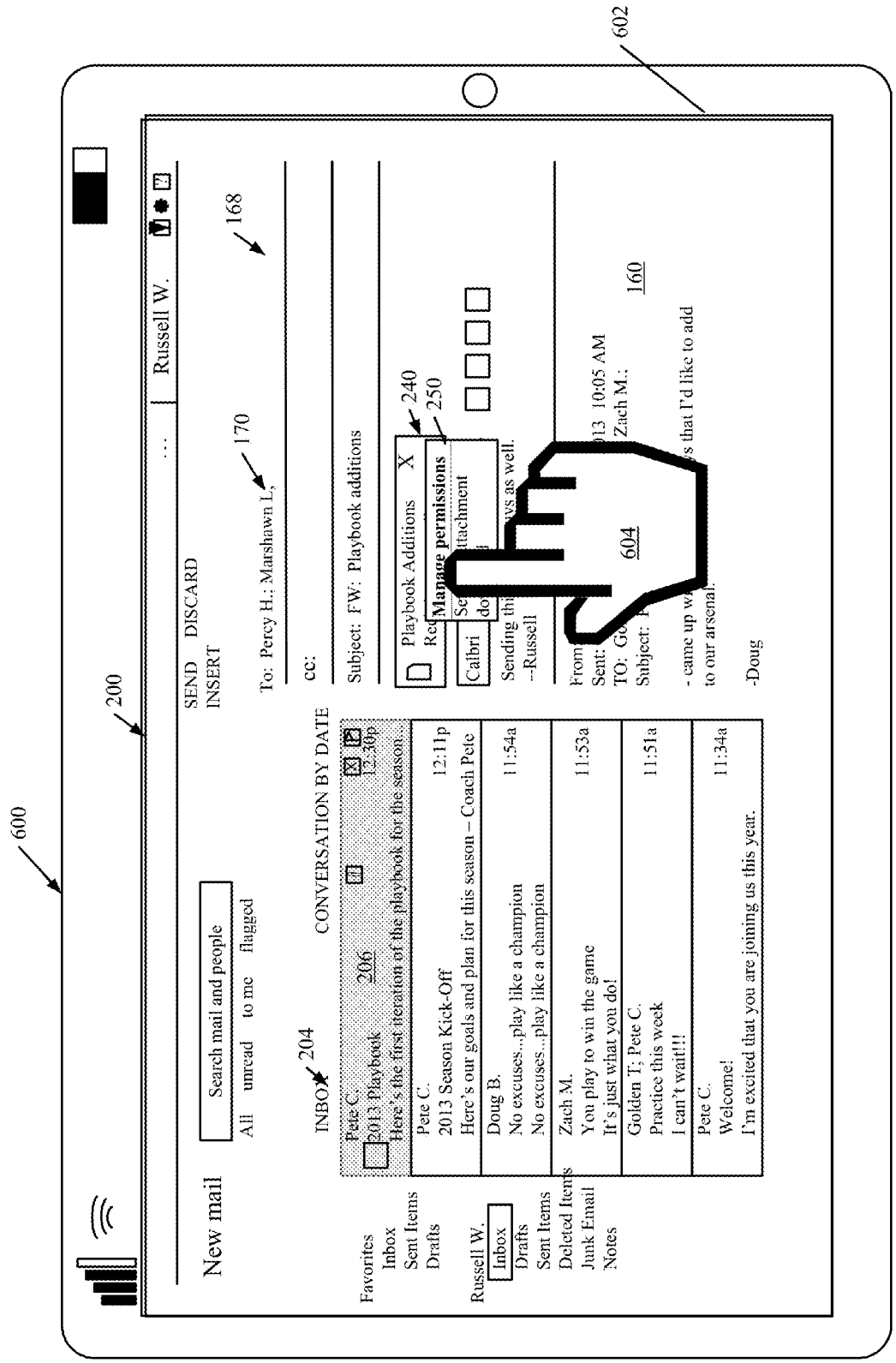

FIG. 7 shows one embodiment in which device 16 is a tablet computer 600. In FIG. 7, computer 600 is shown with user interface display 200 (from FIG. 4B) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 8:
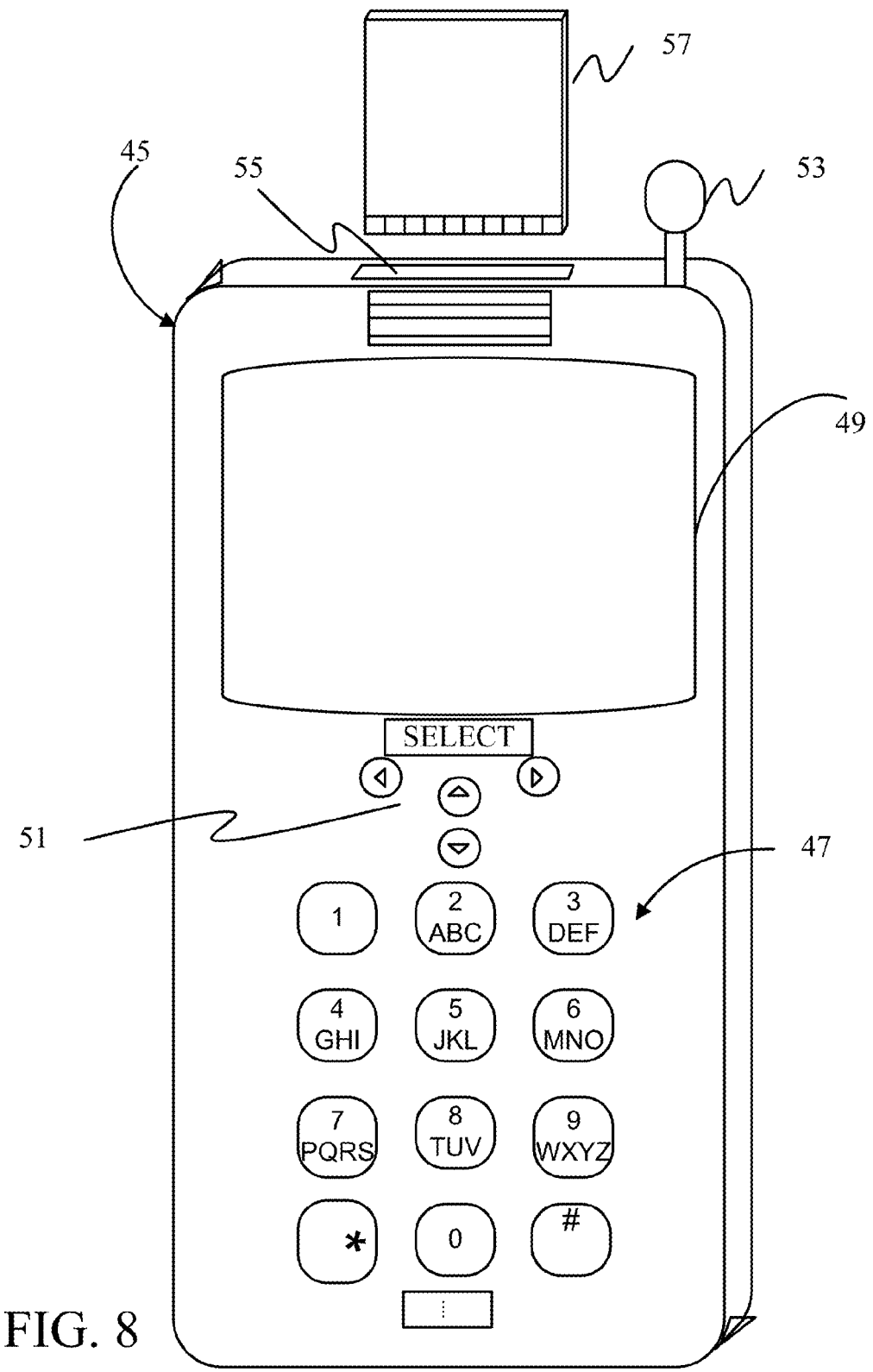
Figure 9:
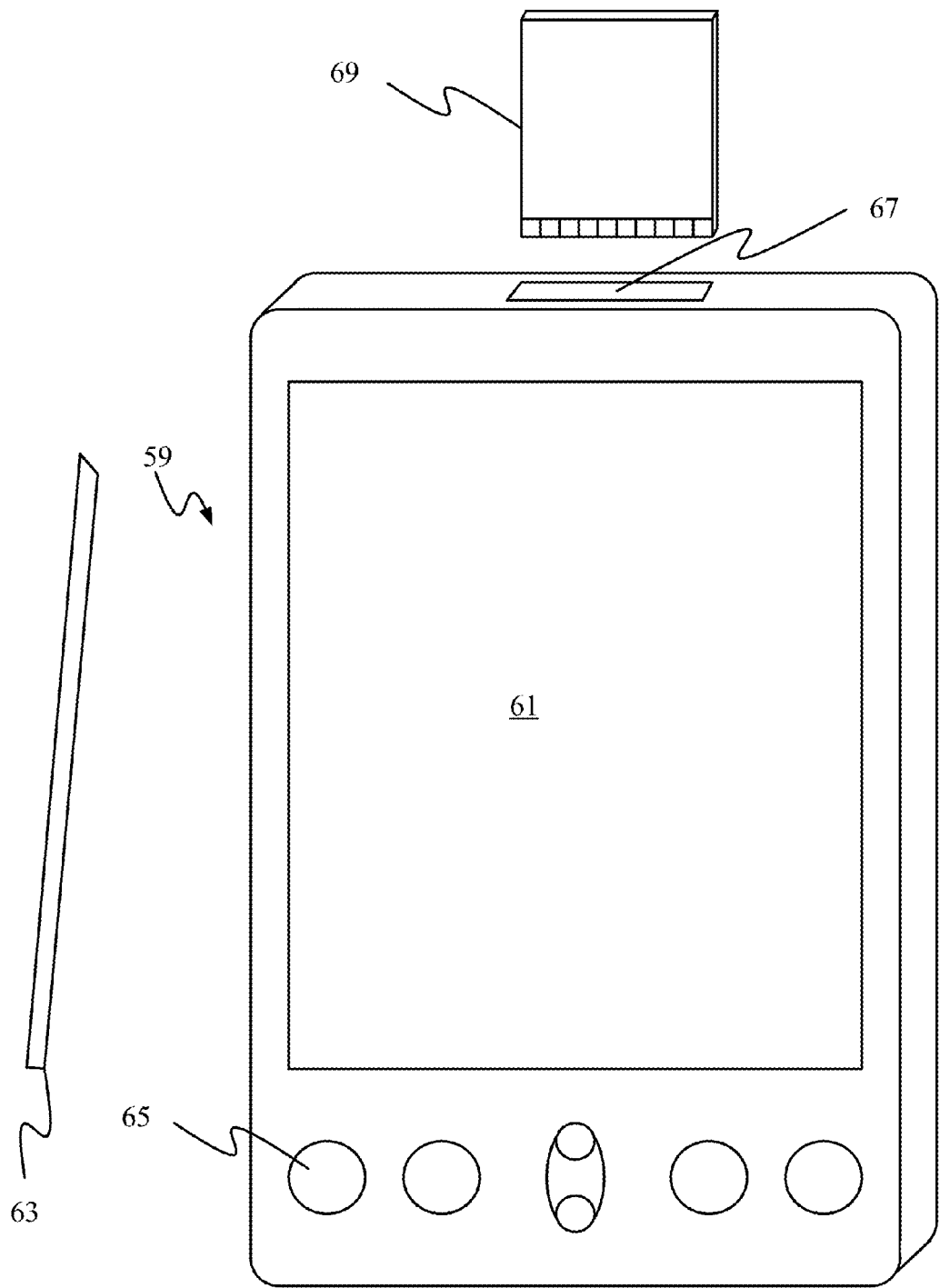

FIGS. 8 and 9 provide additional examples of devices 16 that can be used, although others can be used as well. In FIG. 8, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xrtt, and Short Message Service (SMS) signals. In some embodiments, phone 45 also includes a Secure Digital (SD) card slot 55 that accepts a SD card 57.

The mobile device of FIG. 9 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 10:
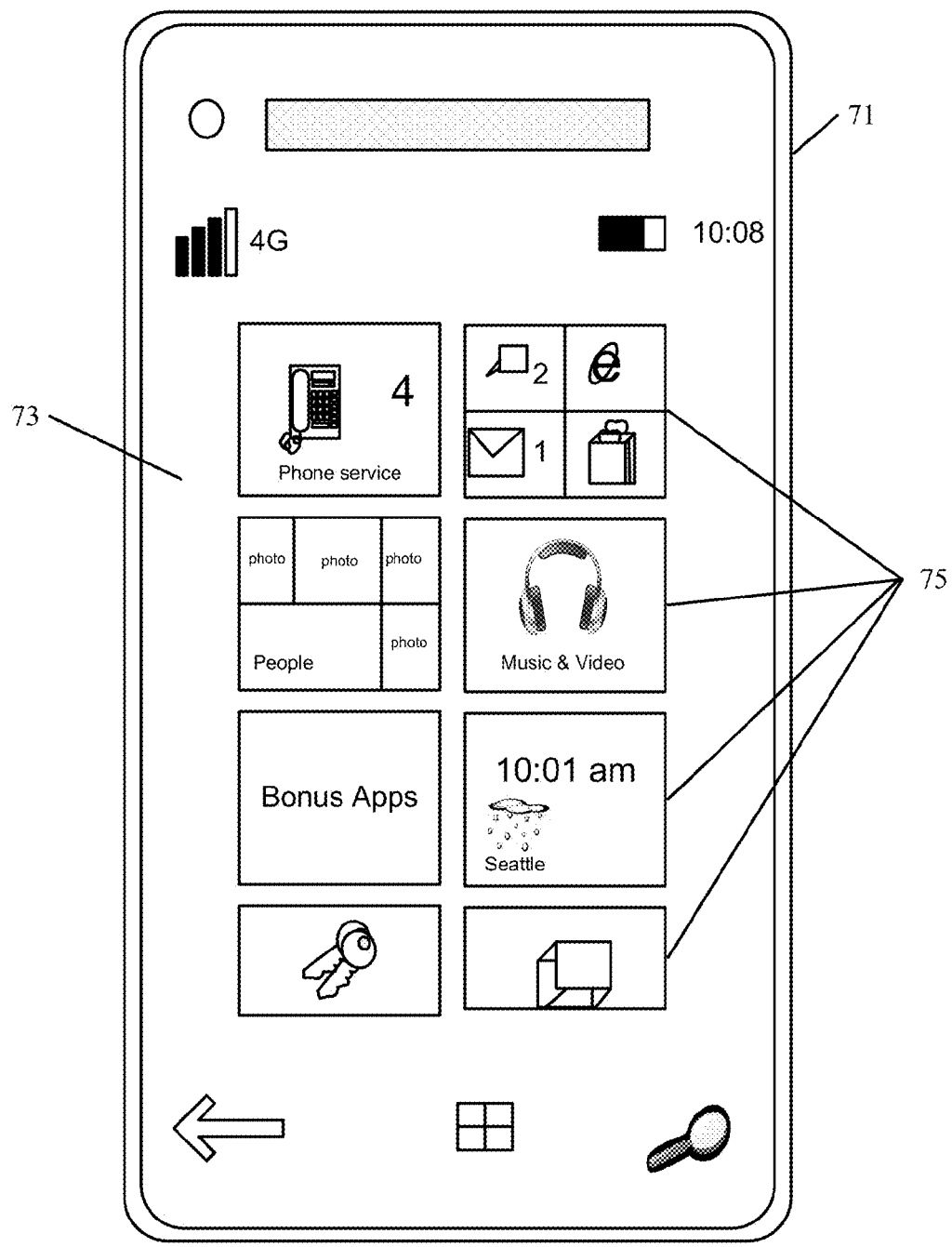
Figure 11:
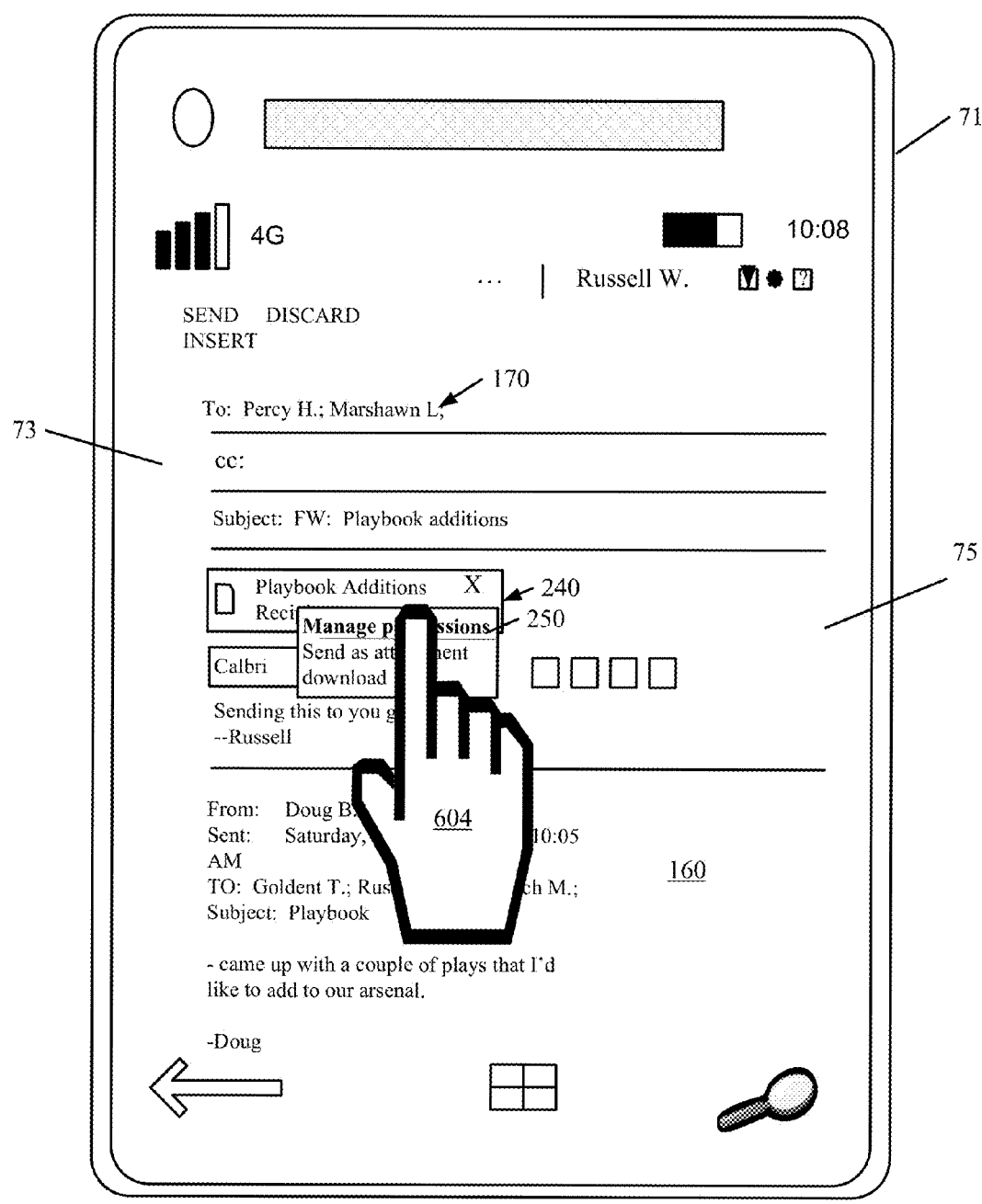

FIG. 10 is similar to FIG. 8 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone. FIG. 11 shows smart phone 71 with the display of FIG. 4B displayed thereon.

Note that other forms of the devices 16 are possible.

Figure 12:
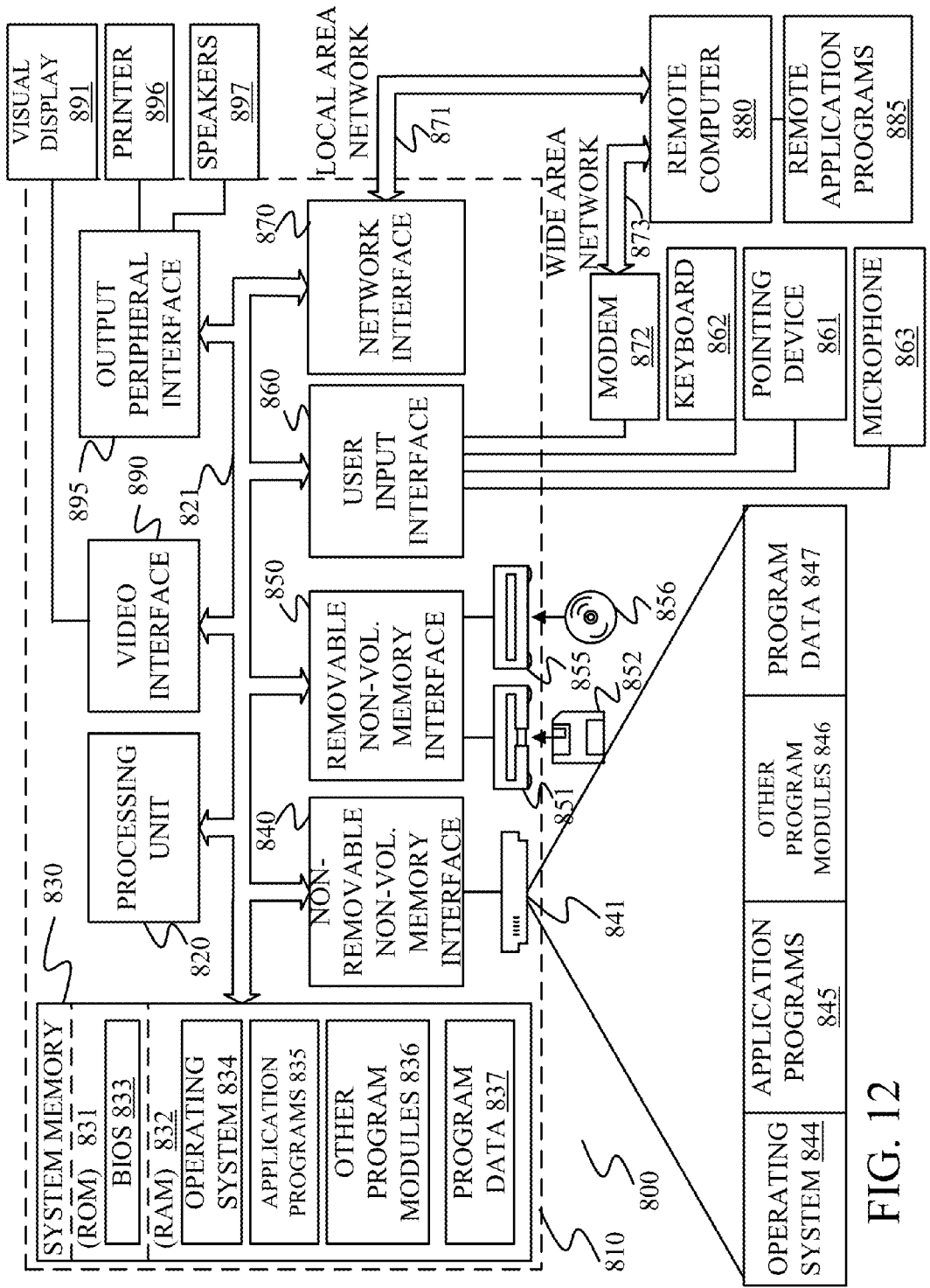
FIG. 12 is a block diagram of one embodiment of a computing environment.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 134 or 136), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of controlling a messaging system, comprising:
   detecting that a user of an organization, that deploys the messaging system, is sending a message to a recipient;
   determining whether the recipient is an external recipient, that is external to the organization;
   if the recipient is an external recipient and external sharing is disabled in the messaging system, then displaying an error message;
   if the recipient is an external recipient and external sharing is enabled in the messaging system, then
      accessing an access control list to determine whether the recipient has permissions to access a shared object and, if the recipient does not have permissions to access the shared object, modifying permissions in the access control list to set the permissions for the recipient to have access to the shared object; and
   if the recipient is not an external recipient, then
      accessing an access control list to determine whether the recipient has permissions to access the shared object and, if the recipient does not have permissions to access the shared object, modifying permissions in the access control list to set the permissions for the recipient to have access to the shared object.

2. The computer-implemented method of claim 1 wherein detecting that the user is sending the message comprises:
   detecting that the message includes the link to the shared object.

3. A computing system comprising:
   at least one processor; and
   memory storing instructions executable by the at least one processor, wherein the instructions configure the computing system to:
      detect that a user of an organization, that deploys a messaging system, is sending a message to a recipient;
      determine whether the recipient is an external recipient, that is external to the organization;
      if the recipient is an external recipient and external sharing is disabled in the messaging system, then display an error message;
      if the recipient is an external recipient and external sharing is enabled in the messaging system, then
         access an access control list to determine whether the recipient has permissions to access a shared object and, if the recipient does not have permissions to access the shared object, modify permissions in the access control list to set the permissions for the recipient to have access to the shared object; and
      if the recipient is not an external recipient, then
         access an access control list to determine whether the recipient has permissions to access the shared object and, if the recipient does not have permissions to access the shared object, modify permissions in the access control list to set the permissions for the recipient to have access to the shared object.

4. The computing system of claim 3 wherein the instructions configure the computing system to:
   detect that the message includes the link to the shared object.

5. A computing device comprising:
   at least one processor; and
   memory storing instructions executable by the at least one processor, wherein the instructions configure the computing device to:
      detect that a user of an organization, that deploys a messaging system, is sending a message to a recipient;
      determine whether the recipient is an external recipient, that is external to the organization;
      if the recipient is an external recipient and external sharing is disabled in the messaging system, then display an error message;
      if the recipient is an external recipient and external sharing is enabled in the messaging system, then
         access an access control list to determine whether the recipient has permissions to access a shared object and, if the recipient does not have permissions to access the shared object, modify permissions in the access control list to set the permissions for the recipient to have access to the shared object; and
      if the recipient is not an external recipient, then
         access an access control list to determine whether the recipient has permissions to access the shared object and, if the recipient does not have permissions to access the shared object, modify permissions in the access control list to set the permissions for the recipient to have access to the shared object.

6. The computing device of claim 5, wherein the instructions configure the computing device to:
   detect that the message includes the link to the shared object.

* * * * *